(12) United States Patent
Tuch et al.

(10) Patent No.: US 9,268,678 B2
(45) Date of Patent: Feb. 23, 2016

(54) MEMORY DEFRAGMENTATION IN A HOSTED HYPERVISOR

(75) Inventors: Harvey Tuch, Cambridge, MA (US); Craig Newell, Cambridge, MA (US); Cyprien Laplace, Grenoble (FR)

(73) Assignee: VMware, Inc., Palo Alto, CA (US)

( * ) Notice: Subject to any disclaimer, the term of this patent is extended or adjusted under 35 U.S.C. 154(b) by 1090 days.

(21) Appl. No.: 13/309,686

(22) Filed: Dec. 2, 2011

(65) Prior Publication Data

US 2013/0145073 A1    Jun. 6, 2013

(51) Int. Cl.
| | |
|---|---|
| *G06F 12/10* | (2006.01) |
| *G06F 12/02* | (2006.01) |
| *G06F 12/12* | (2006.01) |
| *G06F 9/50* | (2006.01) |
| *G06F 9/455* | (2006.01) |

(52) U.S. Cl.
CPC ............ *G06F 12/023* (2013.01); *G06F 9/5022* (2013.01); *G06F 12/121* (2013.01); *G06F 9/45533* (2013.01); *G06F 2212/1044* (2013.01)

(58) Field of Classification Search
CPC ... G06F 12/023; G06F 12/121; G06F 9/5022; G06F 2212/1044; G06F 9/45533
USPC .................................................. 711/6, 203
See application file for complete search history.

(56) References Cited

U.S. PATENT DOCUMENTS

| | | | |
|---|---|---|---|
| 6,496,847 B1 * | 12/2002 | Bugnion et al. ................... 718/1 |
| 7,290,110 B2 * | 10/2007 | Loafman ........................ 711/170 |
| 7,500,048 B1 * | 3/2009 | Venkitachalam et al. ........ 711/6 |
| 7,802,070 B2 * | 9/2010 | Cholleti et al. ............... 711/170 |
| 8,359,451 B2 * | 1/2013 | Chen et al. ..................... 711/170 |
| 8,583,875 B1 * | 11/2013 | Garthwaite et al. .......... 711/147 |
| 8,775,716 B1 * | 7/2014 | Cook et al. ......................... 711/6 |
| 2004/0064671 A1 * | 4/2004 | Patil ............................... 711/203 |
| 2005/0060509 A1 * | 3/2005 | Loafman ....................... 711/170 |
| 2006/0236059 A1 * | 10/2006 | Fleming et al. ............... 711/170 |
| 2007/0156981 A1 * | 7/2007 | Bitner et al. .................. 711/159 |
| 2007/0288719 A1 * | 12/2007 | Cholleti et al. ............... 711/170 |
| 2008/0155168 A1 * | 6/2008 | Sheu et al. ........................ 711/6 |
| 2008/0288718 A1 * | 11/2008 | Hepkin et al. ................ 711/104 |
| 2009/0313445 A1 * | 12/2009 | Pandey et al. ................ 711/162 |
| 2010/0057818 A1 * | 3/2010 | Gao et al. ...................... 707/813 |
| 2012/0030406 A1 * | 2/2012 | Chang et al. ...................... 711/6 |
| 2012/0124270 A1 * | 5/2012 | Weissman et al. ................ 711/6 |
| 2012/0233435 A1 * | 9/2012 | Ben-Yehuda et al. ........ 711/170 |
| 2012/0324199 A1 * | 12/2012 | Yamashita et al. ............ 711/170 |

OTHER PUBLICATIONS

International Search Report and Written Opinion dated Feb. 28, 2013, Application No. PCT/US2012/067605 filed Dec. 3, 2012, 18 pages.
"Method and System for Controlling Memory Ballooning", IP.com Journal, IP.com Inc., West Henrietta, NY, US, Jun. 11, 2010, XP013138626, ISSN: 1533-0001.

\* cited by examiner

*Primary Examiner* — Mark Giardino, Jr.
*Assistant Examiner* — Ramon A Mercado

(57) ABSTRACT

Machine memory fragmentation in a computer system having a host operating system and virtual machine running on a hypervisor hosted by the host operating system is reduced by having the hypervisor identify and release those machine memory pages that are more likely than others to reduce the fragmented state of the host machine memory.

22 Claims, 4 Drawing Sheets

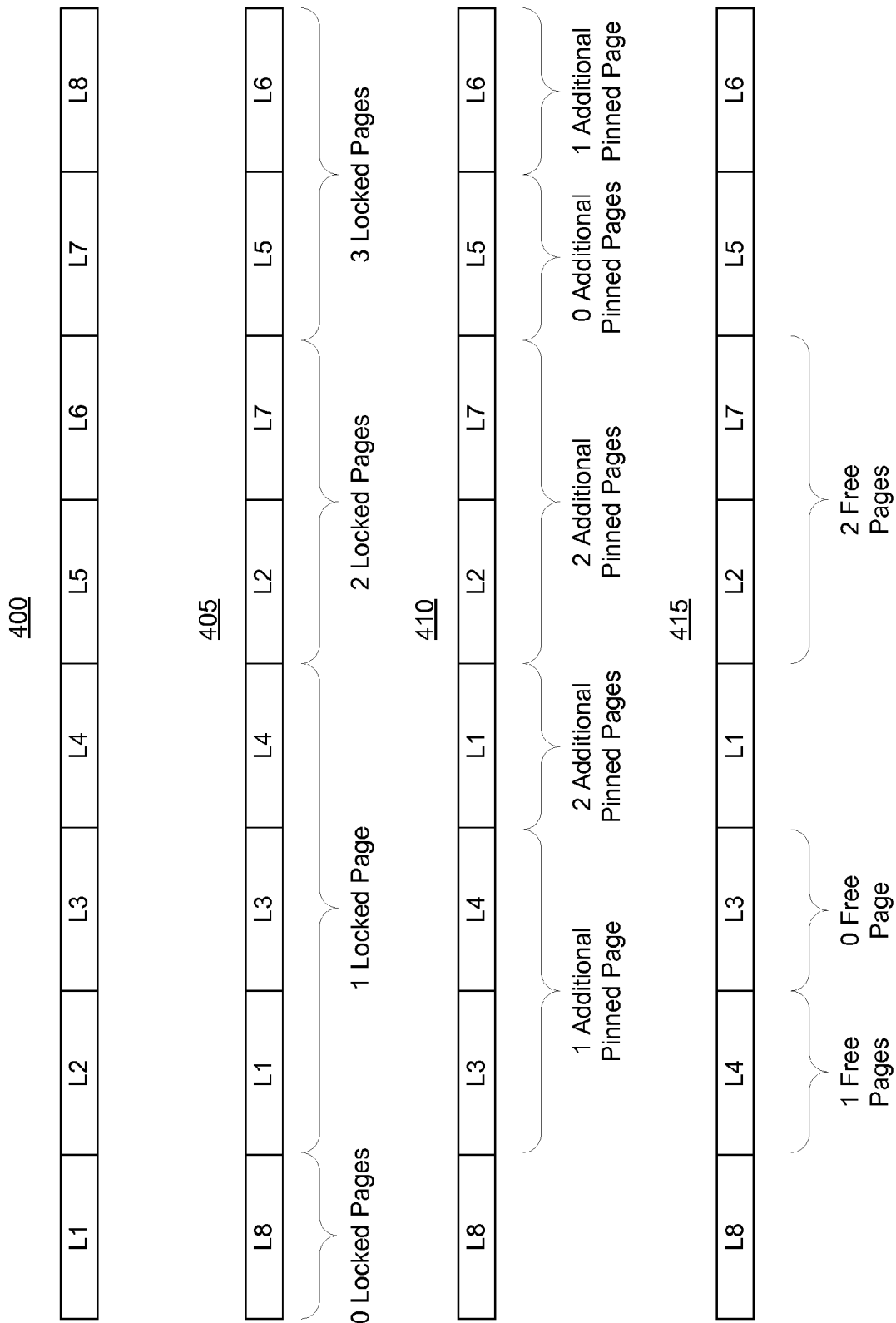

MEMORY DEFRAGMENTATION IN A HOSTED HYPERVISOR

BACKGROUND

Over the past decade, enterprises have experienced a substantial increase in the productivity of its workforce when providing them with business mobile devices. In the past, given their high cost, business mobile devices were mainly allocated to management and focused on providing employees with email access and cellular phone capabilities. However, recent improvements in the computing power, mobile display technologies and connection speeds of mobile devices, combined with the continued decreases in hardware costs, have made powerful mobile devices available even to the general public for personal use. More and more individuals personally own powerful mobile devices, such as smartphones, that, in addition to serving as a cellular phone, can be used in many of the same ways as a desktop or a laptop, such as accessing emails, browsing documents or the internet, game playing, listening to audio or viewing videos, and personal information management (PIM).

Due to the above trends in mobile devices, enterprises are currently experiencing an "invasion" of personal devices into the workplace. Given the sophisticated capabilities of their personal mobile devices, employees no longer desire possessing separate personal and business mobile devices and continually pressure information technology (IT) departments to support personal devices brought into the workplace. As such, IT departments struggle to maintain a proper balance between enabling a certain level of access to enterprise data (e.g., such as access to email, contacts, documents, and the like) on personal devices and ensuring adequate security measures to protect corporate intellectual property in such enterprise data. This phenomenon has led enterprises to investigate the viability of a "Bring Your Own Device" (BYOD) strategy to IT, where a personal mobile device is provisioned by IT departments with the capability of operating as a complete business mobile device in a secure fashion.

Virtualization has been proposed as a solution for consolidating personal and business uses in a single mobile device. With virtualization, personal and work environments remain isolated. As a result, the user need not provide enterprise IT departments any control of the user's personal environment and the enterprise IT departments can retain strict control of the user's work environment. Another important feature of virtualization is that the user's work environment will be platform independent. Regardless of the type of personal mobile device the user chooses, the resulting work mobile device through virtualization will be identical. Therefore, enterprise IT departments need to support only one type of work mobile device.

When a mobile device is provisioned in the manner described above for both personal and work uses, it is not uncommon for a hypervisor to be hosted on an underlying host operating system (OS), and to rely on the host OS kernel memory allocation module to allocate machine memory of the host (as distinct from "physical" memory of a VM running on the mobile device, portions of which may not necessarily map to machine memory at any particular moment in time due to the capability of some hypervisors to allocate an amount of machine memory to a VM that may be more than a currently available amount of machine memory in the host) for both the hypervisor and any virtual machine (VM) instantiated by the hypervisor (e.g. a virtual work mobile device running on the personal mobile device). Further, it is not uncommon for the memory provisioned by the host OS kernel memory allocation module to the VM and hypervisor to be "pinned" such that the host OS cannot unilaterally revoke or modify the address or size of the memory allocation. That is, unlike ordinary applications on the host OS, the hypervisor is explicitly aware of the machine addresses of memory allocations, so pinning is required to prevent the host OS from unilaterally modifying those machine addresses. Memory allocations for the hypervisor and VM can remain pinned in the foregoing manner for extended durations because pinned pages are not immediately returned to the host OS when they are no longer required by the VM or hypervisor, but are instead reused by the VM and hypervisor. The long-lived pinned pages can, over time, fragment the machine memory of the host to such a degree that the host OS kernel cannot satisfy large, contiguous machine memory allocation requests from requestors such as applications, host kernel device drivers and subsystems, etc. Further, because all machine pages allocated to the hypervisor and VM are pinned, standard host OS kernel defragmentation mechanisms cannot operate on the pages to reduce fragmentation. As a result, even when sufficient free machine memory exists for the host OS to use separate from the pinned memory allocated to the VM and hypervisor, it may not be possible for the host OS to satisfy certain memory allocation requests, such as those requiring a large number of contiguous pages (i.e., $2^n$ contiguous pages, where n>0).

Large contiguous page allocations are routinely required for page tables, the network stack and device drivers and therefore an inability to satisfy such memory allocations can be catastrophic for the host OS. The inability to satisfy large contiguous page allocations may result in the host OS attempting to swap certain machine memory pages to disk to free such memory pages with the hope that some of the freed pages will form sufficiently contiguous blocks to satisfy the request. Additionally, if the memory request is non-blocking (i.e., the request must be satisfied immediately and the thread invoking the request cannot be blocked (put to sleep) while waiting for memory to free up) and/or there exists no swap mechanism (as is the case with the Android® OS), an out-of-memory (OOM) "killer" component of the kernel, and in some implementations, a low memory killer component of the kernel, may be invoked, asynchronously terminating processes, some of which may be essential to sustaining the user experience on the mobile device. Worse, livelock, where the system consumes CPU cycles but makes no progress, can result as processes are terminated, restarted and terminated again when required. For example, the system may terminate process A to supply a large, contiguous machine memory page request made by process B. The system may then restart process A and terminate process B to supply a large, contiguous machine memory page request made by process A. Such a terminating and restarting loop, known as "livelock," can repeat ad infinitum.

SUMMARY

One or more embodiments provide techniques to reduce machine memory fragmentation in a computer system having a host OS and VM running on a hypervisor hosted by the host OS. According to these techniques, when the hypervisor "releases" machine memory pages allocated to the VM back to the host OS, the hypervisor selects those machine memory pages that are more likely to reduce the fragmented state of the host machine memory.

A technique of selecting machine memory pages allocated to the VM to be released back to the host OS, according to an embodiment of the invention, includes the steps of associating the machine memory pages allocated to the VM with large pages according to machine memory locations thereof, identifying a large page out of said large pages that has the smallest number of machine memory pages allocated to the VM, and selecting a machine memory page allocated to the VM from the identified large page for release back to the host OS.

A technique of selecting machine memory pages allocated to the VM to be released back to the host OS, according to an embodiment of the invention, includes the steps of associating the machine memory pages allocated to the VM with large pages according to machine memory locations thereof, ranking the large pages in accordance with how many machine memory pages allocated to the VM are contained therein, selecting a large page out of said large pages based on said ranking, and selecting a machine memory page allocated to the VM contained within the selected large page for release back to the host OS.

Further embodiments include a non-transitory computer-readable storage medium storing instructions that, when executed by a computer system, cause the computer system to perform one or more the techniques set forth above, and a computer system programmed to carry out one or more of the techniques set forth above.

BRIEF DESCRIPTION OF THE DRAWINGS

FIG. 4 shows an example of large page ordering according to an embodiment.

DETAILED DESCRIPTION

Figure 1:
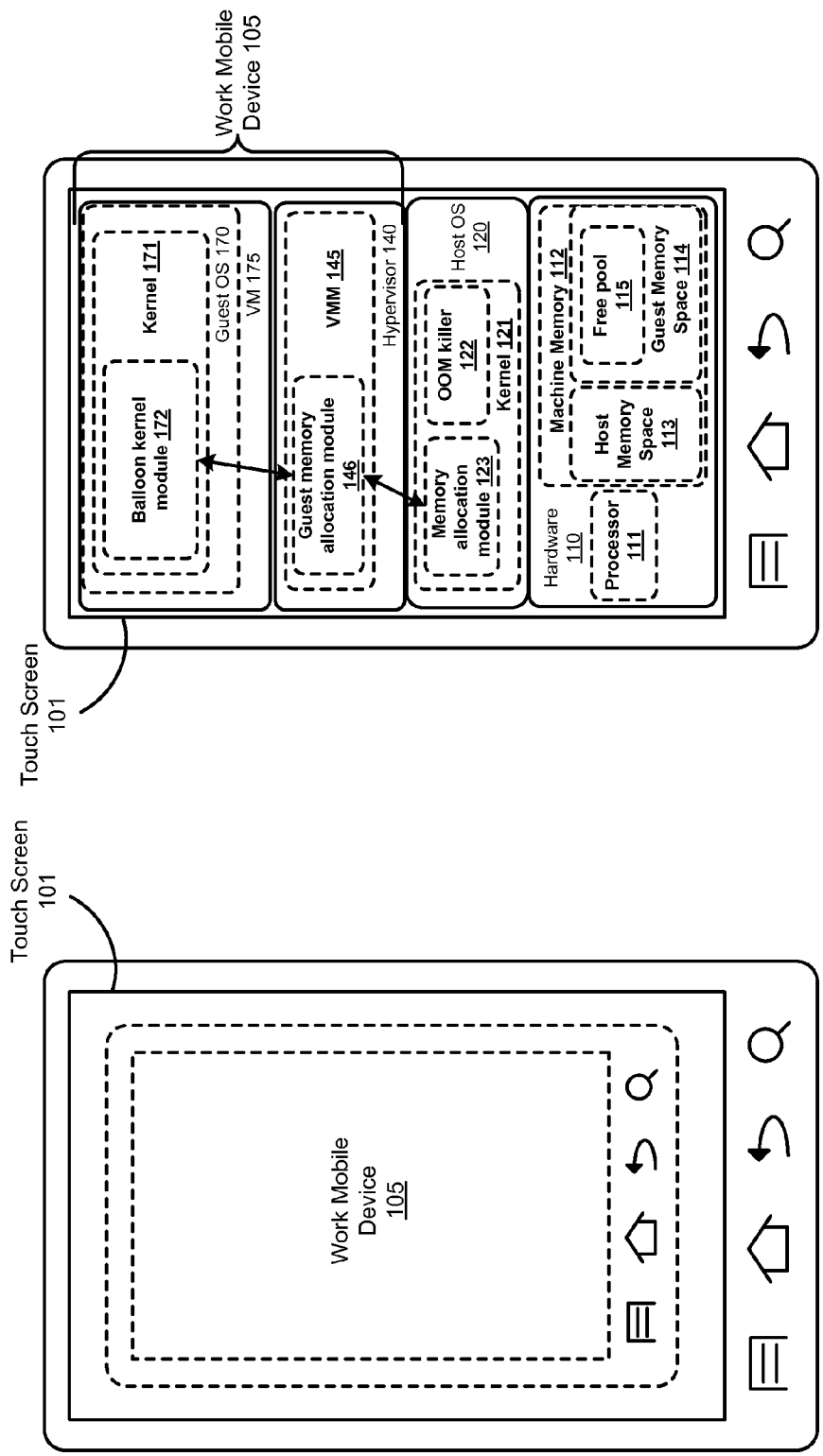
FIG. 1A is a schematic illustration of a mobile computing device according to one or more embodiments.
FIG. 1B illustrates components of the mobile computing device of FIG. 1A that implement a selective memory release technique according to one or more embodiments.

FIG. 1A is a schematic illustration of a mobile device according to one or more embodiments. The mobile device shown in FIG. 1A is a personal mobile device 100 having a touch screen 101. Personal mobile device 100 may be a smartphone, a tablet computing device, and in general any computing device that is portable and configured for wireless connectivity with a network. Personal mobile device 100, conceptually, provides access to a completely separate work mobile device 105 that is generally isolated and operates separately from personal mobile device 100 (illustrated in dashed lines to indicate the work mobile device 105 is running as a software component inside personal mobile device 100). As further discussed below, in one embodiment, work mobile device 105 operates as a virtual machine running within a virtualization platform that is itself running on top of the OS of personal mobile device 100. As further detailed in FIG. 1B, personal mobile device 100 comprises hardware 110 such as processor and memory, firmware that includes host OS 120, (e.g., the Android® operating system provided by Google, Inc.).

As depicted in FIG. 1B, work mobile device 105 operates as a VM 175 running on hypervisor 140 and, conceptually, includes a virtual machine monitor (VMM) 145. VMM 145 may be considered a component of hypervisor 140 that emulates hardware resources for work mobile device 105. Work mobile device 105 further includes a guest OS 170, which may be any commodity operating system such as the Android® operating system.

Personal mobile device 100 includes components for implementing a memory release technique for selectively releasing memory from guest OS 170, running on a VM 175 (i.e., the "guest"), to host OS 120 (i.e., the "host"), according to one or more embodiments. These components include a kernel 121 of host OS 120, a kernel 171 of guest OS 170, a balloon kernel module 172 running as a module inside kernel 171, a memory allocation module 123 inside host OS kernel 121 for performing memory allocation and deallocation on behalf of the VMM 145, and a guest memory allocation module 146 included in VMM 145. Guest memory allocation module 146 maintains a pool of free memory pages that are allocated to the guest ("guest free pool"), and therefore "pinned" in memory 112, but are not currently used. The guest free pool is shown as free pool 115 in guest memory space 114. The host memory space is shown as host memory space 113. It should be understood that host memory space 113 and guest memory space 114 are each represented as a single box in FIG. 1B, but in actual use, can be highly fragmented. In one embodiment, host OS kernel 121 and guest OS kernel 171 are both Linux kernels. In such a case, host OS 120 may be, for example, Android®.

Host OS kernel 121 manages machine memory 112, allocating free memory on demand for use in its caches (e.g., page cache, slabs, etc.) and for applications and kernel modules (e.g., drivers, etc.). In certain embodiments, such as embodiments where Android® is host OS 120 and host OS kernel 121 is a Linux kernel, OOM killer 122 may be invoked by host OS kernel 121 to asynchronously terminate processes, e.g., when machine memory is fragmented to such an extent that host OS kernel 121 cannot allocate a large number of contiguous machine pages (e.g., $2^n$ contiguous machine memory pages, where n>0).

Guest OS 170 supports user-level applications that are executed in work mobile device 105 and includes a guest OS kernel 171 that manages guest physical memory (e.g., machine memory 112 as emulated by VMM 145 and considered by guest OS 170 as actual physical memory) in the same manner host OS kernel 121 manages machine memory 112 of mobile device 100. Guest OS kernel 171 includes balloon kernel module 172 that manages a memory ballooning process similar to that described in U.S. patent application Ser. No. 13/215,930, filed Aug. 23, 2011 and entitled "Cooperative Memory Resource Management for Virtualized Computing Devices," the entire contents of which are incorporated by reference herein.

Figure 2:
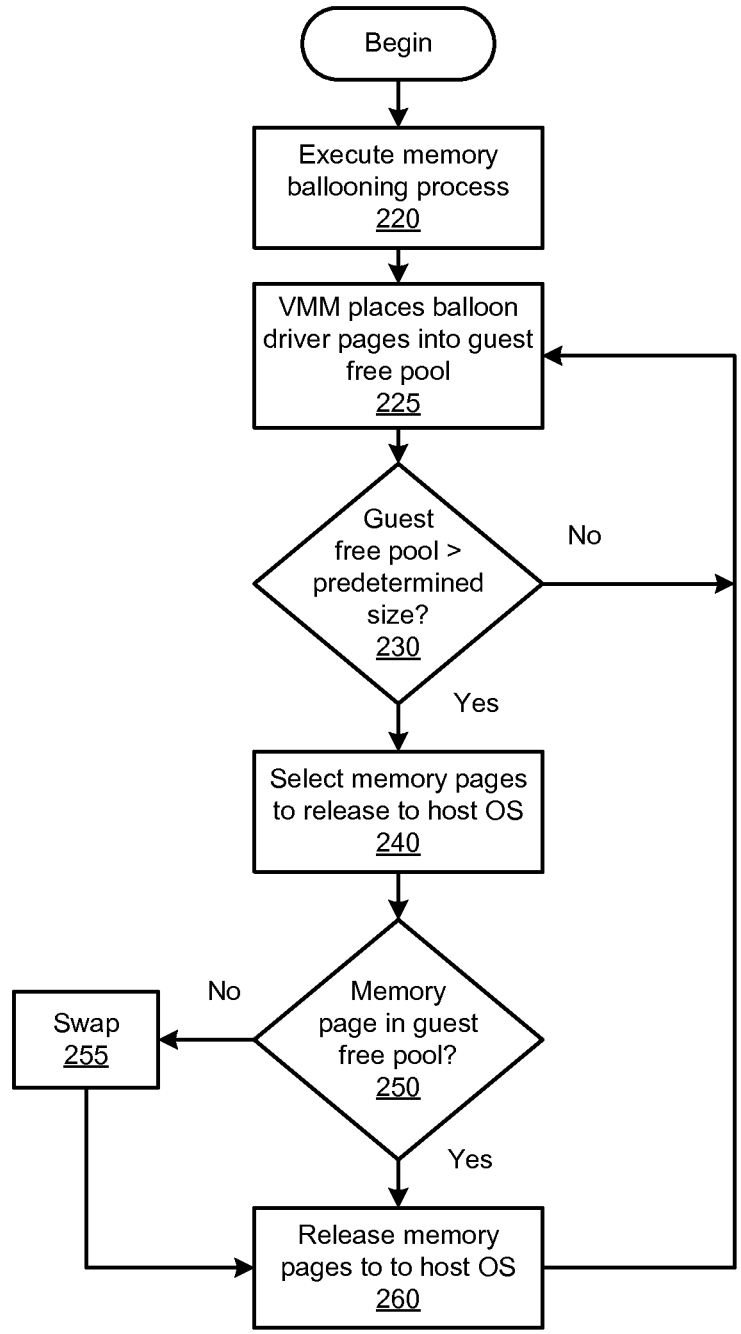
FIG. 2 is a flow chart of a memory releasing process according to an embodiment.

FIG. 2 is a flow chart of a memory releasing process according to an embodiment. The memory releasing process, which is represented by steps 240 through 260, is executed by VMM 145 when, after step 220 (during which guest OS 170 increases the balloon size and informs VMM 145 that one or more pages are currently held by balloon kernel module 172 and hence eligible for release back to host OS kernel 121), and step 225 (during which VMM 145 places one or more of the pages held by balloon kernel module 172 into guest free pool 115), VMM 145 determines at step 230 that the size of guest free pool 115 is greater than a predetermined size (e.g., 1 MB, etc.) signifying that there is extra machine memory that can be released back to host OS 120. In one embodiment, release of a memory page back to host OS 120 includes unpinning the page and returning the page to memory allocation module 123 of host OS kernel 121. In some embodiments, the predetermined size of guest free pool 115 is set to be large enough to amortize the overhead of switching back to host OS 120. That is, the predetermined size is set such that machine memory pages are released in "batches," rather than individually, but the batches are not so large that free machine memory pages that could be better used by host OS 120 are maintained for lengthy durations within guest free pool 115. In alternative embodiments, step 230 and the memory releasing process represented by steps 240 through 260 may be executed after memory swapping, compression, page sharing, etc. and placement of free machine memory pages in guest free pool 115 as a result thereof.

Alternatively, if, at step 230, VMM 145 determines that the size of guest free pool 115 is not greater than the predetermined size, VMM 145 performs the check at step 230 again when it detects at step 225 that one or more memory pages have been placed in guest free pool 115.

The memory releasing process begins at step 240 with VMM 145 selecting memory pages to release back to host OS 120. In one embodiment, the selection of which memory pages to release back to host OS 120 is made in accordance with an algorithm described below in conjunction with FIG. 3. The selected memory page or pages may or may not be in guest free pool 115. It should be recognized that memory pages allocated to the guest that are not in guest free pool 115 are currently being used by applications or other processes in VM 175. If at step 250, VMM 145 determines that a particular selected memory page is not in guest free pool 115 (i.e., currently being used by VM 175, etc.), VMM 145 performs a swap at step 255 so that contents of the selected memory page are copied to another memory page in guest free pool 115. After such a swap, step 260 is carried out where VMM 145 releases the memory pages selected at step 240 back to the host 120. If at step 250, VMM 145 instead determines that the memory page is already in guest free pool 115, step 260 is carried out without swapping. After step 260, VMM 145 proceeds to step 225 and when it detects that one or more free pages have been placed in guest free pool 115, it performs the check at step 230 again.

Figure 3:
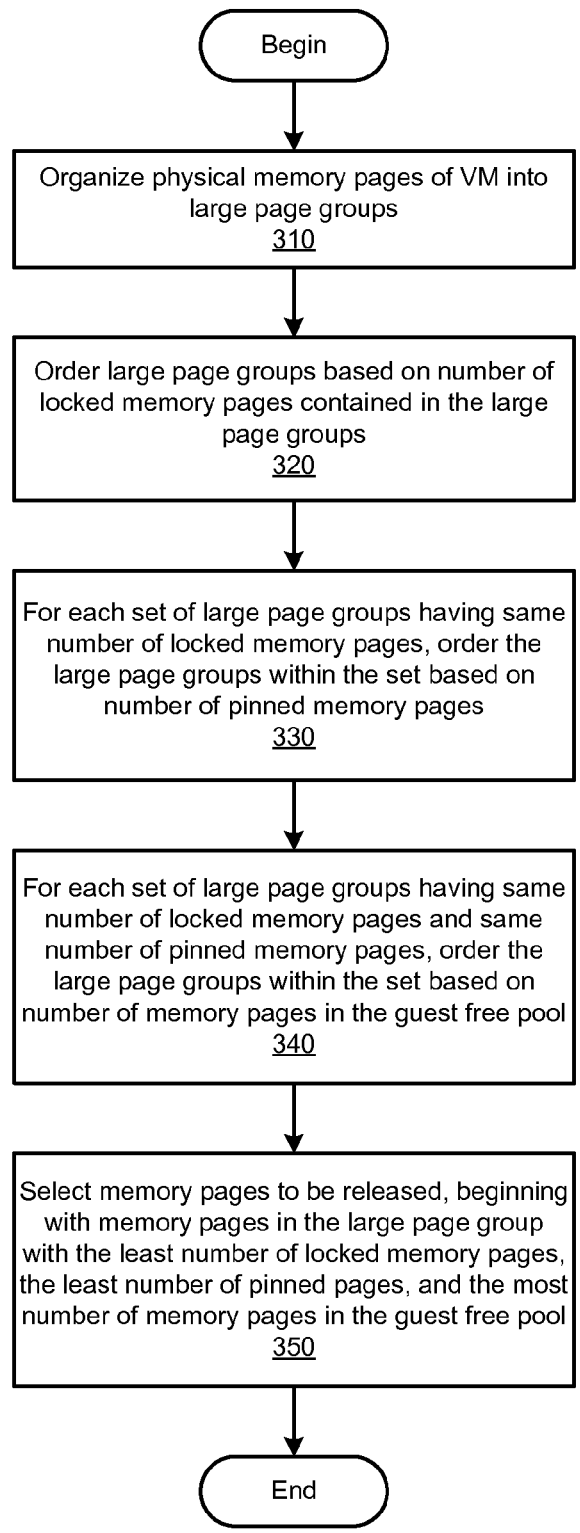
FIG. 3 is a flow chart of a process for selecting memory to be released according to an embodiment.

FIG. 3 is a flow chart of a process for selecting memory to be released according to an embodiment. For example, the process of FIG. 3 may be implemented in step 240 of FIG. 2 in one embodiment. As such, the process of FIG. 3 represents an algorithm carried out by VMM 145 to identify those memory pages allocated to VM 175 that are most likely to reduce memory fragmentation of machine memory 112. At step 510, VMM 145 associates machine memory pages allocated to VM 175 with "large" pages, the sizes of which are determined by the host's memory allocation module 123, in accordance with the locations of the memory pages in the host's machine memory space. A "large" page includes $2^n$ contiguous machine pages, where n is greater than 0, and in the embodiment described herein, n is 2. The value n is selected by memory allocation module 123 to support kernel requests bounded by hardware constraints. To give one example where n is 2, if memory pages allocated to VM 175 (sometimes referred to herein as "guest memory pages") map to memory page locations 0, 1, 2, 3, 5, 10, 11, 15, 18, and 23 in the machine memory space (with memory page locations 4, 6-9, 12-14, 16-17, 19-22, 24 et seq. in the machine memory space allocated to other processes or free for allocation by memory allocation module 123), and one large page equals 4 machine memory pages, the guest memory pages will be associated with 6 large pages. The first large page will contain the guest memory pages that map to memory page locations 0, 1, 2, and 3 in the machine memory space. The second large page will contain the guest memory page that maps to memory page location 5 in the machine memory space. The third large page will contain the guest memory pages that map to memory page locations 10 and 11 in the machine memory space. The fourth large page will contain the guest memory page that maps to memory page location 15 in the machine memory space. The fifth large page will contain the guest memory page that maps to memory page location 18 in the machine memory space. The sixth large page will contain the guest memory page that maps to memory page location 23 in the machine memory space.

In some embodiments, the number of pages a large page includes may be selected based on the configuration of OOM killer 122. For example, OOM killer 122 may be configured to asynchronously terminate a process only when a non-blocking request for 8 KB or 16 KB of contiguous machine memory cannot be satisfied. In such cases, any kernel component making requests of size 8 KB or 16 KB of contiguous machine memory will have its request satisfied even if such contiguous machine memory is not available by invoking OOM killer 122 when necessary. On the other hand, non-blocking requests of larger sizes of contiguous machine memory can only be satisfied if such contiguous machine memory is available. Further, in such cases, the size of large pages may be chosen to be 16 KB because defragmenting at the 16 KB would reduce fragmentation at both 8 KB and 16 KB.

At step 320, VMM 145 orders, from lowest to highest, the large pages based on the number of "locked" memory pages that are contained in each respective large page. A locked page corresponds to a guest memory page that is currently locked by hypervisor 140 because a virtualized input-output (I/O) operation is being performed on that page. During a virtualized I/O operation, host OS 120 is supplied with the machine address of the guest memory page. Under such circumstances, a change to the guest physical address-to-host machine address mapping would cause the machine address being used by host OS 120 to be mapped to an incorrect guest physical address. Because such a change can occur via, for example, swapping of guest memory pages during defragmentation, hypervisor 140 may lock the guest physical pages on which I/O operations are being performed to prevent, for example, swapping of the guest physical memory pages during defragmentation. It should thus be understood that the set of locked pages is a subset of pinned pages for which the guest physical address-to-host machine address mapping is, at least temporarily, fixed.

At step 330, for each set of large pages having same number of locked memory pages, VMM 145 orders, from lowest to highest, the large pages within the set based on the number of pinned, but not locked, memory pages that are contained in the respective large pages.

At step 340, for each set of large pages having same number of locked memory pages and same number of pinned memory pages, VMM 145 orders, from highest to lowest, the large pages within the set based on the number of pinned pages contained in the respective large pages that are in the guest free pool.

After the ordering has been carried out in accordance with steps 320, 330, and 340, VMM 145 selects at step 350 the memory pages to be released beginning with the memory pages that are in the large page with the least number of locked memory pages, the least number of pinned pages, and the most number of memory pages in the guest free pool 115, and then working down until sufficient number of memory pages have been released back to the host OS 120 so that the condition shown in step 230 is no longer met.

In some embodiments, after VMM 145 releases memory pages back to host OS 120, host OS 120 performs a further defragmentation process to potentially free one or more additional large pages. For example, such further defragmentation may be performed to support a page table allocation request.

FIG. 4 shows an example of large page ordering according to an embodiment. Large pages 600 show an unordered configuration of large pages L1 through L8. An ordering of large pages by VMM 145 as described in 320, 330 and 340 are depicted in 405, 410, and 415, respectively. In this example, each large page contains four pages, and each page is of size 4 KB. In addition, L8 has no locked pages; L1, L3 and L4 each have 1 locked page; L2 and L7 each have 2 locked pages; and L5 and L6 each have 3 locked pages. Therefore, execution of step 320 causes L8 to be ordered first, followed by L1, L3 and L4, then by L2 and L7, and then by L5 and L6. Step 330 is executed to order the large pages that have the same number of locked pages based on the number of number of pinned, but not locked, pages (i.e., "additional pinned pages"). In the 1 locked page group, L3 and L4 are ordered ahead of L1 because L3 and L4 each have 1 additional pinned page while L1 has 2 additional pinned pages. The 2 locked page group is not reordered because L2 and L7 each have the same number of additional pinned pages. The 3 locked page group is not reordered because L5 has less number of additional pinned pages than L6 and is thus already correctly ordered. Step 340 is executed to order the large pages that have the same number of locked and additional pinned pages based on the number of pages that are in guest free pool 115. The execution of step 340 causes L4 to be ordered ahead of L3 because L4 has 1 page in guest free pool 115 while L3 has none. The remaining order is unaffected by step 340.

Although one or more embodiments of the present invention have been described in some detail for clarity of understanding, it will be apparent that certain changes and modifications may be made within the scope of the claims. For example, while embodiments herein have referred to certain mobile operating systems such as Android, it should be recognized that any mobile operating systems may be utilized in alternative embodiments such as Apple's iOS, Research in Motion's Blackberry OS, Microsoft's Windows Phone, Hewlett Packard's webOS, Symbian, Java, and the like, and also non-mobile operating systems such as Mac OS X may be utilized in further embodiments. In addition, it should be recognized that the claims are applicable to embodiments employing a bare metal hypervisor as well as embodiments employing multiple guest virtual machines on a bare metal or hosted hypervisor. Further, while embodiments have been described with respect to kernels and kernel components, it should be recognized that the claims are applicable to other embodiments in which the functionality provided by the kernels and kernel components described herein are provided by other software components. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Virtualization systems in accordance with the various embodiments, which may be hosted embodiments, non-hosted embodiments, or embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest OS that perform virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. In a computer system having a host operating system and a virtual machine, a method of releasing machine memory pages allocated to the virtual machine back to the host operating system, the machine memory pages allocated to the virtual machine including used guest memory pages and free guest memory pages, said method comprising:

organizing the machine memory pages allocated to the virtual machine into sets of large pages according to locations thereof in a machine memory space;

for each set of the sets of large pages having the same number of locked guest memory pages, ranking the large pages in the set based on the number of pinned but not locked guest memory pages;

identifying one or more large pages having a smallest number of machine memory pages that are used guest memory pages and that are locked; and releasing one or more machine memory pages in the identified large pages back to the host operating system.

2. The method of claim 1, wherein the released machine memory pages include at least one of the free guest memory pages.

3. The method of claim 1, wherein the released machine memory pages include at least one of the used guest memory pages.

4. The method of claim 3, further comprising:
copying contents of one or more of the used guest memory pages to one or more of the free guest memory pages.

5. The method of claim 1,
wherein the identified large pages have, among the large pages having the smallest number of locked guest memory pages, the smallest number of pinned but not locked guest memory pages.

6. The method of claim 5, further comprising:
for each set of large pages having the same number of locked and pinned guest memory pages, ranking the large pages in the set based on the number of memory pages in the large pages that are free guest memory pages, wherein the identified large pages have, among the large pages having the smallest number of locked and pinned guest memory pages, the largest number of free guest memory pages.

7. In a computer system having a host operating system and a virtual machine, a method of releasing machine memory pages allocated to the virtual machine back to the host operating system, the machine memory pages allocated to the virtual machine including used guest memory pages and free guest memory pages, said method comprising:
organizing the machine memory pages allocated to the virtual machine into large pages according to machine memory locations thereof;
ranking the large pages based on at least the number of machine memory pages in each large page that are used guest memory pages and that are locked and that are pinned but not locked;
selecting one or more large pages based on said ranking; and
releasing one or more machine memory pages within the selected large pages back to the host operating system.

8. The method of claim 7, wherein said ranking is also dependent on the number of pinned but not locked guest memory pages.

9. The method of claim 8, wherein said ranking is also dependent on the number of memory pages in the large pages that are free guest memory pages.

10. The method of claim 9, wherein the selected large pages have the least number of locked guest memory pages.

11. The method of claim 10, wherein the selected large pages, among large pages with the least number of locked guest memory pages, have the least number of pinned machine memory pages.

12. The method of claim 11, wherein the selected large pages, among large pages with the least number of locked and pinned guest memory pages, have the most free guest memory pages.

13. The method of claim 7, further comprising:
copying contents of one or more of the used guest memory pages to one or more of the free guest memory pages.

14. A non-transitory computer readable storage medium comprising instructions for causing a computer system having a host operating system and a virtual machine to carry out a method of releasing machine memory pages allocated to the virtual machine back to the host operating system, the machine memory pages allocated to the virtual machine including used guest memory pages and free guest memory pages, said method comprising:
organizing the machine memory pages allocated to the virtual machine into sets of large pages according to locations thereof in a machine memory space;
for each set of the sets of large pages having the same number of locked guest memory pages, ranking the large pages in the set based on the number of pinned but not locked guest memory pages;
identifying one or more large pages having a smallest number of machine memory pages that are used guest memory pages and that are locked; and
releasing one or more machine memory pages in the identified large pages back to the host operating system.

15. The non-transitory computer readable storage medium of claim 14, wherein the released machine memory pages include at least one of the free guest memory pages.

16. The non-transitory computer readable storage medium of claim 14, wherein the released machine memory pages include at least one of the used guest memory pages.

17. The non-transitory computer readable storage medium of claim 16, wherein the method further comprises:
copying contents of one or more of the used guest memory pages to one or more of the free guest memory pages.

18. A non-transitory computer readable storage medium comprising instructions for causing a computer system having a host operating system and a virtual machine to carry out a method of releasing machine memory pages allocated to the virtual machine back to the host operating system, the machine memory pages allocated to the virtual machine including used guest memory pages and free guest memory pages, said method comprising:
organizing the machine memory pages allocated to the virtual machine into large pages according to locations thereof in a machine memory space;
ranking the large pages based on at least the number of machine memory pages in each large page that are used guest memory pages and that are locked and that are pinned but not locked;
selecting one or more large pages based on said ranking; and
releasing one or more machine memory pages within the selected large pages back to the host operating system.

19. The non-transitory computer readable storage medium of claim 18, wherein said ranking is also dependent on the number of pinned but not locked guest memory pages in the large pages, and the number of memory pages in the large pages that are free guest memory pages.

20. The non-transitory computer readable storage medium of claim 19, wherein the selected large pages have the least number of locked guest memory pages, or, among large pages with the least number of locked guest memory pages, the selected large pages have the least number of pinned machine memory pages, or, among large pages with the least number of locked and pinned guest memory pages the selected large pages have the most free guest memory pages.

21. The non-transitory computer readable storage medium of claim 14, wherein the locked guest memory pages are locked for input-output (I/O) operations by a hypervisor on which the virtual machine runs.

22. The non-transitory computer readable storage medium of claim 18, wherein the locked guest memory pages are locked for input-output (I/O) operations by a hypervisor on which the virtual machine runs.

* * * * *